US005964988A

United States Patent [19]

LaRose et al.

[11] Patent Number: 5,964,988

[45] Date of Patent: *Oct. 12, 1999

[54] WEB FEEDER WITH CONTROLLED ELECTROSTATIC FORCE AND METHOD

[75] Inventors: Joseph A. LaRose, Ravenna; Allen Steven Pucciani, Mentor, both of Ohio

[73] Assignee: Avery Dennison Corporation, Pasadena, Calif.

[ * ] Notice: This patent is subject to a terminal disclaimer.

[21] Appl. No.: 09/010,696

[22] Filed: Jan. 22, 1998

Related U.S. Application Data

[62] Division of application No. 08/763,606, Dec. 11, 1996, Pat. No. 5,900,218, which is a continuation of application No. 08/404,726, Mar. 15, 1995, Pat. No. 5,605,607.

[51] Int. Cl.$^{6}$ ...................................................... B01J 19/08

[52] U.S. Cl. ............................................ 204/164; 226/94

[58] Field of Search ............................... 204/164; 226/94

[56] References Cited

U.S. PATENT DOCUMENTS

| | | | |
|---|---|---|---|
| Re. 26,951 | 9/1970 | Vaccaro | 226/94 |
| 4,129,469 | 12/1978 | Deverell et al. | 226/94 |
| 4,402,035 | 8/1983 | Kisler | 226/94 |
| 4,462,528 | 7/1984 | Kisler | 226/94 |
| 4,501,954 | 2/1985 | Sturdevant | 219/399 |
| 4,852,820 | 8/1989 | Looser | 226/94 |
| 5,224,026 | 6/1993 | Okayama | 363/21 |
| 5,605,607 | 2/1997 | LaRose et al. | 204/164 |

FOREIGN PATENT DOCUMENTS 1264201 10/1960 Germany .

OTHER PUBLICATIONS

"Electrostatically Assisted Core Starts on Automatic Winders"; Tappi Journal; vol. 76, No. 11; pp. 231–237; Nov. 1993.

*Primary Examiner*—Kishor Mayekar
*Attorney, Agent, or Firm*—Renner, Otto, Boisselle & Sklar, P.L.L.

[57] ABSTRACT

A method and apparatus for applying a uniform electrostatic force to a web moving between a pair of electrodes to create an electron wind that urges the web toward one of the electrodes controls the current forming the electron wind to maintain the current and the wind force substantially constant even though impedance may vary. The method may be used to provide a hard nip, to adjust tension, to spread and/or to smooth a coating, to remove curl, and to cure a coating.

49 Claims, 3 Drawing Sheets

WEB FEEDER WITH CONTROLLED ELECTROSTATIC FORCE AND METHOD

This application is a division of U.S. patent application Ser. No. 08/763,606, filed Dec. 11, 1996, now U.S. Pat. No. 5,900,218 which is a continuation of Ser. No. 08/404,726, filed Mar. 15, 1995 now U.S. Pat. No. 5,605,607.

TECHNICAL FIELD

This invention relates generally, as is indicated, to apparatus and method for applying electrostatic force and web processing and moving equipment which use electrostatic force and related methods, and, more particularly, to apparatus and method for accurately controlling and applying electrostatic force, sometimes referred to as a corona wind or electron wind, to sheet material and the like and methods of handling, processing, treating, and moving such material.

BACKGROUND

When feeding a web of flexible non-metallic material, such as an elongate sheet of paper, plastic, fabric, etc., for various purposes, such as to apply a coating thereto, to cure a coating thereon, to print thereon, etc., the web is pulled from a supply or source, such as a storage drum or reel or some other supply source, or is otherwise moved along a path. Usually one or more rolls or the like support the web as it is moved along a path and one or more drive rolls (also referred to as a "pull roll") pull the web along that path. Often it is desirable to provide relatively strong engagement or frictional engagement of the web and the surface of a drive roll to avoid slippage therebetween. Such slippage can result in non-uniform speed of web movement along the path, and such non-uniformity may detrimentally affect the web, the coating or the like applied to the web, etc. For example, such non-uniform speed can result in non-uniform coating of the web, non-uniform curing of the coating material, wrinkles, folds, and/or tears in the web, and so on.

Therefore, often it is desirable to maintain a controlled or adjustable uniform speed of travel of a web through coating equipment, heating or curing equipment, and/or other equipment. However, the speed of travel may tend to change as the diameter of the supply reel and/or the take up drum or reel changes when the web is transferred from one to the other. As those changes occur, the force required to maintain tension on the web and/or to maintain the pulling force on the web may vary. Various techniques have been used to hold the web to a pull roll used to move the web along the path. One technique is to use one roll, such as an idler roll, to press the web against the pull roll. The idler roll may be located in direct confronting engagement with the pull roll separated from it only by the web or the idler roll may be relatively upstream or downstream of the pull roll to urge the web into engagement with the pull roll; in either case the idler roll usually engages a surface of the web opposite the surface which is engaged by the pull roll. There are several disadvantages to using such idler roll technique, two of which are, as follows: the idler rolls add to the size, expense, and mechanical servicing requirements of the equipment; and sometimes it is especially undesirable for a roll surface, such as that of an idler roll, to engage the mentioned "opposite" surface of the web, for example, such surface being one on which a coating or the like has been applied and has not yet cured. The engagement of the idler roll with such a coated surface may damage the coating and/or may result in damaging of the idler roll, for example, in the event coating material were to stick to the idler roll itself.

Idler rolls and/or drive rolls also have been used to form a hard nip between two rolls. A hard nip tends to isolate the relatively upstream and downstream portions of the web relative to each other for various purposes. However, use of more rolls for a hard nip also encounters several of the disadvantages mentioned above. For example, it has been found in one prior web processing machine, to obtain a hard nip for isolating portions of a web moving through the machine between a drive roll and a nip forming roll, such as an idler roll, can require approximately 3 to 5 horsepower (2,100–3,500 watts) energy to move the drive roll of such a hard nip. It would be desirable to be able to provide a hard nip without requiring such large amount of energy.

A vacuum technique also has been used in the past to hold a web to a pull roll. For example, the pull roll may have openings in the surface, and those openings are connected to a vacuum source. The vacuum at those openings draws the web to the pull roll. However, such vacuum techniques are complex and expensive.

An electrostatic technique also has been used in the past to provide relatively strong engagement between a web and the surface of a pull roll without the need to touch the surface of the web opposite the surface which is engaged with the pull roll. An example is described in U.S. Pat. No. Re. 26,951, the entire disclosure of which hereby is incorporated by reference.

Using such an electrostatic technique, a charge of static electricity is applied to the web as it travels along its path, and that charge causes a force which urges the web against the surface of the drive roll. In one such system the drive roll is electrically conductive and a corona discharge device spaced apart from the drive roll provides a static electricity discharge toward the web and drive roll urging the web against the drive roll. An electrostatic system also has been used in the past to apply tension to a web by using the electrostatic force to urge the web against an electrically conductive brake bar; by varying the strength of the electric field produced between the source of electrostatic energy and the brake bar, for example, a drag force of correspondingly varying magnitude can be applied to the web.

In prior electrostatic systems of the type mentioned above the actual force applied to the web varies as various parameters change. The electrostatic derived force applied to the web depends on the current which flows between the electrostatic charge-supplying device and the drive roll or brake bar; and as resistance changes, the current also may change. Such resistance changes may occur due to changes in the gap or spacing between the static charge supplying device and the electrically conductive drive roll or brake bar, for example; and such resistance changes also may be due to changes in ambient humidity, moisture content of the web, composition of the web, thickness of the web, undulations in the web, coating material on the web, etc. The variation in current and, thus, force with which the web is urged into engagement with the drive roll or brake bar can result in slippage of the web relative to the drive roll, change in tension, change in time that a web is located in heating or other curing equipment, change in thickness or amount of coating applied to a surface of the web, etc., each of which can reduce the quality of the finished web product.

Sometimes a coated web is directed through a heated area, such as an oven, in which elevated temperature tends to cure the coating. It is desirable to maintain the uniform speed of a web during coating and curing, for if the web remains too long in the oven, the coating may be non-uniformly cured and/or it or the web itself may be burned. If the web is not in the curing zone of the oven, the coating may not sufficiently cure. These curing problems also may occur when means other than heat is used to induce or to assist curing.

Usually it is desirable to provide uniformity in the distribution of coating material on a surface of a web. The coating may be applied, for example, by a roll which picks up the coating material from a reservoir and applies the coating material to the web surface. However, non-uniformity of the coating can be caused by an imperfection in the application roll, dirt in the reservoir supply, and/or irregularities in the web surface to which the coating is to be applied. The non-uniformity may be due to placing of coating at only some, but not all locations on the web or due to roughness in the coating or uneven thickness or distribution of the coating. Accordingly, there is a need in the art to improve the uniformity in the coating applied to a surface of a web or other sheet material, especially when that web or sheet material is moving continuously.

In accordance with the invention, then, one aspect relates to a method of applying an electrostatic force to a moving web, comprising moving a web in a space between at least one pair of electrodes, supplying a voltage to the electrodes to cause a flow of electrons in the space between the electrodes to apply an electrostatic force to the web, and controlling the current flowing between the electrodes thereby to control the electrostatic force.

Another aspect relates to a method for applying a controlled force to a web, comprising directing an electric current between a source of electrostatic energy and into an electrically conductive member to create an electrostatic force to urge a web toward such member, and controlling the current of such source to maintain a desired electric current in said directing step thereby to control the force applied to such web.

A further aspect relates to apparatus for applying electron wind to a material, comprising a plurality of electrodes having a space therebetween, means for supplying current to the electrodes to cause an electron wind in the space, and means for controlling the current to maintain the electron wind substantially constant as the electrical impedance in the space may vary.

An additional aspect relates to a method for applying a controlled corona wind to a material for maintaining a constant force on the material, comprising directing a corona wind toward the material, and controlling the current of the corona wind to maintain a substantially constant current of the corona wind thereby to maintain a desired substantially constant force on the material although the electrical impedance in the path of the corona wind may vary.

Even another aspect relates to a method of controlling tension in a web travelling along a path, comprising directing a corona wind toward web to urge the web against a surface, and adjusting the current flowing in the corona wind thereby to control force urging the web against such surface.

Even a further aspect relates to a method of spreading or smoothing a coating located on a surface, comprising applying a corona wind to the surface with sufficient force to distribute the coating on the surface.

Even an additional aspect relates to a method of avoiding distortions in a moving web, comprising applying an electrostatic force to a web to urge it into engagement with another surface to resist movement and, thereby, to create a tension in the web, and controlling the force with which the web is urged into engagement thereby to control the tension and to maintain the length characteristics of the web substantially constant over the width thereof.

Yet another aspect relates to a method of removing curl from a paper-like web of material travelling along a path, comprising applying moisture to the web, and stretching the web between a drive roll and a relatively hard nip, and forming the relatively hard nip by applying an electrostatic force between a source of electrons and an electrically conductive member to urge the web toward such member.

Yet a further aspect relates to a method of controlling the dimensionality of a web travelling along a path, comprising stretching the web between a drive roll and a relatively hard nip, and forming the relatively hard nip by applying an electrostatic force between a source of electrons and an electrically conductive member to urge the web toward such member.

Yet an additional aspect relates to a method of curing a coating on a web, comprising applying a controlled electrostatic energy field to the web and coating to effect curing of the coating.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but several of the various ways in which the principles of the invention may be employed.

Although the invention is shown and described with respect to the embodiments below, it is obvious that equivalents and modifications will occur to others skilled in the art upon the reading and understanding of the specification. The present invention includes all such equivalents and modifications, and is limited only by the scope of the claims.

DESCRIPTION

Figure 1:
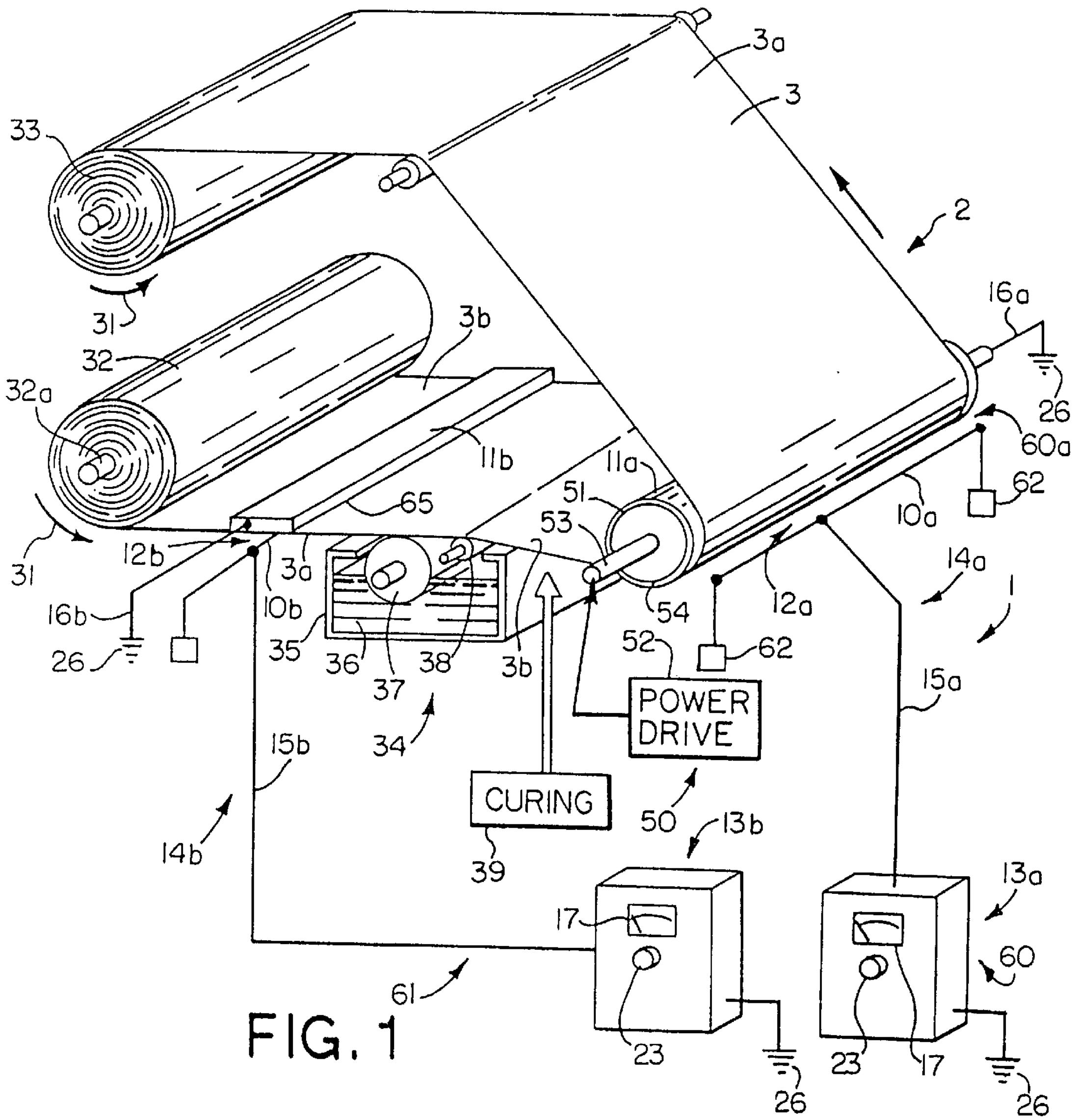
FIG. 1 is a schematic illustration of a web processing machine in which a coating is applied to a moving web and a controlled electrostatic force or electron wind is used in accordance with the present invention.

Referring, now, in detail to the drawings, wherein like reference numerals designate like parts in the several figures (and letter and primed suffixes designate similar parts corresponding to parts without such suffix, e.g., 11, 11*a* and 11*j*'), and initially to FIG. 1, a controlled electrostatic force applying apparatus 1 (sometimes hereinafter referred to as "electrostatic apparatus" or simply as "apparatus" for brevity) in accordance with the present invention is shown with or in conjunction with a web processing machine 2 which applies a coating to a web 3. The web processing machine 2 is exemplary of a system in which the electrostatic system 1 may be used. The coating applied to the web 3 may be, for example, an adhesive coating, ink, some other printing or indicia, waterproofing, etc. It will be appreciated that the apparatus 1 may be used not only in conjunction with a web coating machine 2 but also for other purposes in which a material, usually sheet material, and preferably moving sheet material, is otherwise or additionally processed, manufactured, etc. The apparatus 1 may be used with other types of material, too, if desired, to take advantage of the operating characteristics and functions of the apparatus 1.

Figure 2:
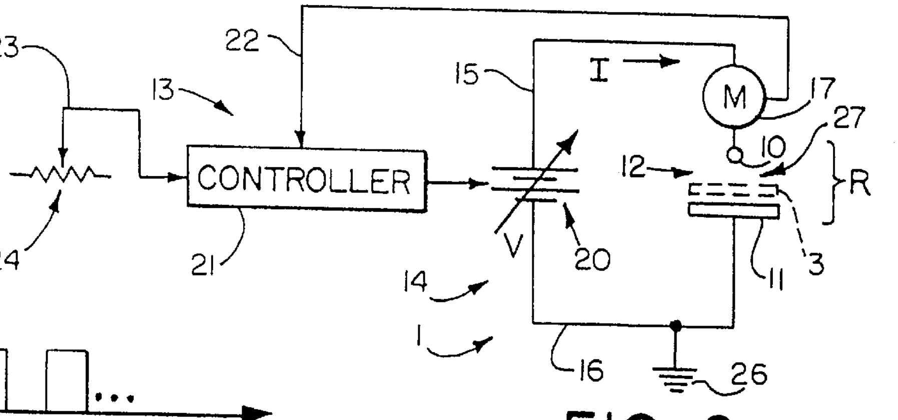
FIG. 2 is a schematic electric circuit diagram of an apparatus for applying electrostatic wind to material, such as a web, in accordance with the present invention and as is also illustrated in FIG. 1.

As is shown in both FIG. 1 and FIG. 2, the controlled electrostatic force applying apparatus 1 includes a pair of electrodes 10 (10*a* and 10*b* in FIG. 1), 11 (11*a* and 11*b* in FIG. 1) that are spaced apart from each other establishing a space or gap 12 (12*a*, 12*b* in FIG. 1) in which a web 3, for example, may be placed and moved. The apparatus 1 also includes a source or supply of electrical energy 13, which is connected in a circuit 14 with the electrodes 10, 11. The circuit 14 (14*a*, 14*b* in FIG. 1) includes the electrical supply 13, electrical conductor, lead or path 15 (15*a*, 15*b* in FIG. 1), the electrode 10, the space 12, the electrode 11, and a further electrical conductor, lead or path 16 (16*a*, 16*b* in FIG. 1). Electrical supply 13 may include a battery or some other electrical supply with an appropriate controller that provide a voltage V across the electrodes 10, 11 via the conductors 15, 16, and the supply 13 also provides a current I to flow in the circuit 14.

The electrode 10 may be tungsten, tungsten alloy or some other electrically conductive material. The electrode 10 may be a wire or wire-like material to provide sufficient field concentration and distribution of electrons flowing in the space 12 relative to the electrode 11. The electrode 11 may be a metal bar, such as a steel or some other electrically conductive material. Since the web 3 may be urged into engagement with the electrode 11 the electrode should have sufficient strength, durability, stiffness, and wear characteristics to avoid damage during or as a result of use. The electrodes 10, 11 may be of other material or shape, one example being presented in the above-mentioned reissue patent.

The current I will be a function of the voltage V divided by that resistance or impedance in the circuit 14. A significant part of that impedance is identified as a resistance R shown in FIG. 2, which exists in the space 12 between the electrodes 10, 11. That resistance R may change from time to time due to changes in the ambient humidity, temperature, moisture content of the web 3, other impedance characteristics of the web 3, thickness and/or distortion of the web 3, coating on the web 3 and/or thickness of the coating, distribution of the coating, other non-uniformities in the coating, etc. The electrostatic field, ion or electron flow or current flowing in the space 12 causes there to be what is known as an electron wind or corona wind which applies a force to the web 3 urging it against or toward one of the electrodes.

As the mentioned resistance R changes, in prior devices the current I also would change. Since the electrostatic force or electron wind applied to the web 3 is a function of the current I, a change in the resistance R will change that force which resulted in non-uniform force, which can result in non-uniform operation and/or output web product, in prior devices.

The controlled electrostatic force applying apparatus 1 of the invention provides for control of the current I and, therefore, the force, for example, to maintain them constant at a prescribed or set level. Accordingly, the electrical supply 13 is a variable one. The current flowing in the circuit 14 is measured or monitored by a conventional meter or other sensor 17 to provide a feedback signal for controlling the electrical supply 13 to maintain a constant desired current I.

The electrical supply 13 may include a variable DC voltage source or supply 20, for example, which is coupled to a controller 21. The controller 21 is connected to the meter 17 by a connection 22 and responds to the measured value of the current I to provide an adjustment of the voltage V provided by the voltage supply 20 so that the current I is maintained substantially constant even though the resistance R in the space 12 may vary. An input 23 to the controller 21 may be used to determine a set point, level or magnitude for the current I and the electrostatic force resulting from the electron wind or corona wind between the electrodes 10, 11. The input 23 may be a voltage level input representing a desired force, or some other input to which the controller 21 responds to maintain the current I at a corresponding constant level. An exemplary input 23 may be provided from an electrical source, such as a battery, and an adjustable potentiometer 24 to provide a signal representing the set point, i.e., the desired magnitude, of the current I. For example, such set point determining signal may be a set point current $I_S$, which is provided to the controller 21 and is compared with a signal representing the actual current I, thereby to cause the controller 21 and source 20 to provide an output that causes the current I to be maintained constant as a function of the magnitude of the set point current $I_S$.

The source 20 and controller 21 may be conventional electrical or electronic components (or component). For example, such components may be of the type which responds to a feedback signal representing the actual current I and the set point current $I_S$. An example would be an amplifier which receives the set point signal $I_S$ and a negative feedback signal representing the current I as respective inputs. The two signals would be compared in a comparator and the result of the comparison would be used to increase or to decrease the voltage of the source 20, for example, to maintain the current I constant.

Figure 3:
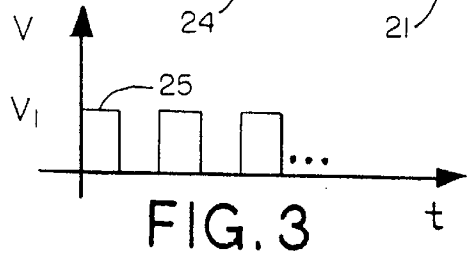
FIG. 3 is a graph depicting a pulsating DC voltage useful, for example, in the circuit of FIG. 2.

In FIG. 2 the voltage supply 20 is shown as a variable voltage source or variable battery, and the voltage V output provided thereby is variable according to the control by the controller 21. To provide the desired electron wind, it is desirable that the voltage V be a DC voltage. However, in many instances the polarity of the voltage is not critical, i.e., it could be positive or negative. As is shown in FIG. 3, the voltage V may be a pulsed DC voltage in which the amplitude of each voltage pulse 25 is $V_1$ and the pulses are occurring at intervals on the order of 40 nanoseconds to 60 nanoseconds with a duty cycle of approximately 50%, i.e., 50% on and 50% off. A non-pulsating DC voltage also may be used. Other forms of DC voltage also may be used consistent with the principles of the invention.

In the embodiment of the invention illustrated in FIGS. 1 and 2, for example, the electrode 10 is coupled to the positive side of the electrical supply 13, and the electrode 11 is coupled to the negative or relative of terminal 26 of the electrical supply 13. When the electrical supply 13 provides voltage across the electrodes 10, 11 and current I flows in the circuit 14, there is a flow of electrons between the electrodes 10, 11. Sometimes that electron flow is referred to as a flow of ions, and sometimes it is referred to as an electrostatic discharge, corona, etc. Regardless of the label applied to such phenomenon, there is effectively a flow of electrons between the electrodes 10, 11 across the space 12 tending to cause what is referred to sometimes as an electron wind or a corona wind. In the embodiment illustrated in FIGS. 1 and 2, such electron wind, which is designated at 27 in FIG. 2, for example, tends to urge the web 3 toward one of the electrodes, and in such embodiment toward the electrode 11. The force of the electron wind on the web 3 is a function of the magnitude of the current I. By maintaining the current substantially constant, the force can be maintained substantially constant.

As is seen in FIG. 1, the web processing machine 2 includes two apparatuses 1, respectively, on each side of a processing zone 30 through which the web 3 is moved in the direction of the arrow 31. The web is supplied from a supply reel 32 which rotates about an axle 32*a*, for example, is moved along a path in the direction of the arrows 31, and is taken up or stored on a take up drum or reel 33. In the processing zone 30 a coating system 34 applies a coating to a surface 3*a* of the web 3. The coating system includes a reservoir 35 containing a coating material 36 that is applied by a coating roller 37 to the web surface 3*a*. An equalizer bar, idler roll or the like 38 also may be included in the coating system 34 for usual purposes. Although the coating system 34 in the processing zone 30 is shown to be of a particular form, it will be appreciated that many other types of coating systems and/or other processing apparatus for processing the web 3 may be used. The exemplary coating system 34 may apply an adhesive, ink, waterproofing material, or other material as a coating or some other type of treatment to the web 3, for example. In the processing zone 30 there also may be included curing apparatus, heating apparatus, and/or other apparatus for treating or otherwise affecting the web 3, as is schematically shown at 39.

The web processing machine 2 also includes at least one drive mechanism 50 for moving the web 3 from the supply drum 32 through the processing zone 30 to the take up drum 33. The drive mechanism 50 includes a drive roll 51, which is rotated (turned) by a motor or other mechanism 52 coupled to a drive shaft 53. The drive roll 51 pulls the web 3 from the supply reel 32 through the processing zone 30. In the illustrated embodiment the drive roll 51 engages the surface 3*b* of the web 3 opposite the coated surface 3*a*; but, if desired, the drive roll may engage the coated surface. The take up reel 33 may be driven to take up the web 3 thereon and to pull the web from the drive roll. One or more of the other rolls shown in the apparatus 2 also may be driven. Furthermore, additional rolls and/or additional processing zones, curing zones or coating or other processing equipment in the processing zone 30 or separate from the processing zone 30 may be included in the machine 2.

In the illustrated embodiment of FIG. 1 the drive roll 51 may be used as an electrode of the apparatus 1. For example, the drive roll 51 may be electrically conductive or at least include an electrically conductive layer 54, which may be at the surface or below the surface thereof. In FIG. 1 such electrically conductive layer 54 is shown at the surface of the drive roll 51 and it serves as electrode 11*a*. The electrically conductive layer 54 (or the entire drive roll 51 if it is conductive) is connected to the ground connection 26 of the electrostatic apparatus circuit 14, as is illustrated.

The controlled electrostatic force applying apparatus 1, as is shown in FIG. 1, includes two electron wind generating portions 60, 61 (also referred to as force applying portions), each with a respective electrostatic electrical energy supply 13*a*, 13*b*. Alternatively, a combined electrical supply may be used with appropriate controls to obtain the desired constant current function described herein. Portion 60 includes a wire electrode 10*a* supported by one or more support or mounting devices 62, such as the schematically illustrated brackets or the like. The wire electrode 11*a* is electrically connected by conductor 15*a* to the controlled electrostatic energy supply 13*a*. In operation of the electrostatic apparatus 1, a voltage is supplied between the electrode 10*a* and the electrode 11*a* (e.g., surface 54) causing a controlled electric current to flow through the space 12*a* in turn causing an electron wind to urge the web 3 into engagement with the drive roll 51. As that electron wind and corresponding force are increased, as is determined by the set point of the supply 13*a* in response to the set point adjustment 23, the force with which the web is urged into engagement with the drive roll 51 and the permitted slippage between the drive roll and the web can be adjusted or controlled. When it is desired that there be minimal slippage (preferably no slippage) the electrostatic apparatus 1 may be set to provide a relatively high current level and electron wind developed force, and vice versa. The portion 60 also may provide a hard nip 60*a* to isolate the portions of the web 3 respectively upstream and downstream of the hard nip.

A comparison of the hard nip 60*a* and the hard nip provided by a pair of rollers, which is mentioned in the background above, demonstrates the substantial energy savings using the invention. In particular, it has been found in on example, which is not intended to be limiting, that the voltage of the circuit 14 may be at about 30 kilovolts to about 80 kilovolts, and the current I is about 0.1 milliamp or less. Therefore, the energy required to obtain the hard nip using the apparatus 1 of the invention may be on the order of from about 1 watt to about 3 watts, which is far smaller than the energy required in prior art systems.

It also has been found in one example of use of the invention that when directing a current flow between plural electrodes, one of which is a wire-like material, to create an electrostatic force urging the web against the other electrode a force on the order of about 3 pounds per linear inch of the web can be obtained. This example is not intended to be limiting.

The electrostatic apparatus 1 further electron wind force applying portion 61 includes a wire electrode 10*b* and a grounded electrode 11*b* coupled with respect to electrical supply 13*b*. The wire electrode 10*b* is mounted on a mounting device 64, such as the schematically illustrated bracket or the like, and is coupled by conductor 15*b* to the electrostatic energy supply 13*b*. The electrode 11*b* is connected to ground 26. Upon application of a voltage between the electrodes 10*b*, 11*b*, a controlled electric current flowing therebetween causes an electron wind and force to urge the web 3 against the confronting surface 65 of the electrode 11*b*. By adjusting the set point using the control 23, the force with which the web is urged against the electrode 11*b* surface 65 can be set, and the circuit 14 maintains that force substantially constant.

The electron wind force applying portion 61 may be used as a brake to resist the movement of the web 3 toward the drive roll 51. By increasing the electron wind, the force with which the web 3 is urged against the electrode 11*b* can be changed; the greater the force, the greater the friction between the electrode 11*b* and the web 3, and the greater the braking force, and vice versa.

The electron wind force applying portions 60, 61 can be operated so that they cooperate to adjust the tension in that portion of the web 3 which is located between them. When the force applied to the web by both of those portions is increased, the tension in the web is increased. If the force applied by the system 60 is at maximum to avoid slippage as the web is pulled by the drive roll 51, tension can be changed by changing the force applied by the force applying system 61. Under appropriate circumstances, for example, when the force applied by the portion 61 is relatively small, tension also may be varied by adjusting the portion 60 and the corresponding slippage of the web 3 relative to the drive roll 51.

In using the web processing machine 2, web material 3 is pulled from the supply reel 32 through the electron wind force applying apparatus portion 61 and through the web processing zone 30 by the drive system 50. The electron wind force applying apparatus portion 60 urges the web 3 against the drive roll 51. The take up reel 33 takes up the coated web from the drive roll 51. The coating system 34 applies a coating to a surface 3*a* of the web 3 and the curing apparatus 39 heats or otherwise cures the coating. The electron wind force applying apparatus portion 61 can apply a controlled force to the web passing therethrough to apply tension or otherwise to affect the web and its movement in the machine 2. Even as the conditions in respective spaces 12*a*, 12*b* of the portions 60, 61 may vary, e.g., due to changes in humidity, coating, web material, etc., the respective electron wind forces remain substantially constant as set to respective set points as is elsewhere described herein.

Figure 4:
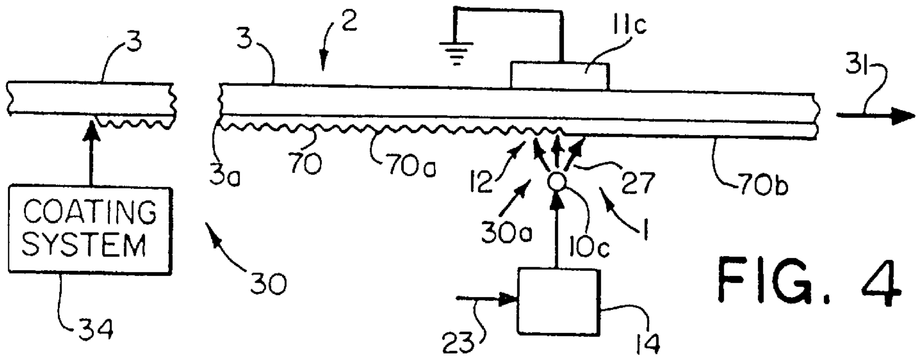
FIG. 4 is a schematic illustration of a method according to the invention for smoothing a coating on a web.

In FIG. 4 is illustrated a portion of a modified processing zone 30*a*. The modified processing zone 30*a* may be a portion of the machine 2 or of some other machine in which an electron wind apparatus 1 in accordance with the invention is used to smooth a coating 70 on a surface 3*a* of a web 3. The processing zone 30*a* may be located downstream of the coating system 34, which may be used to apply the coating 70 to the web. Also, the processing zone 30*a* may be located upstream of the curing apparatus 39 so that the coating 70 may be smoothed before it is cured; however, if desired, the processing zone 30*a* at which the coating is smoothed may be located downstream of the curing apparatus 39.

As is seen in FIG. 4 a portion 70*a* of the coating 70 is relatively rough or undulating after having been applied to the web 3 by the coating system 34. The apparatus 1 directs the electron wind from an electrode 10*c* toward the electrode 11*c* and, in particular, toward the coating. The electron wind 27 tends to smooth the coating 70 resulting in a smooth coating 70*b* relatively downstream of the apparatus 1. The electron wind 27 urges the web against the electrode 11*c* and simultaneously tends to smooth the coating 70. The magnitude of the electron wind can be adjusted by the set point adjustment 23 to obtain the desired smoothing effect. Often it is desirable that a coating be relatively smooth for uniformity of the finished product. The extent of smoothing can be a function of the magnitude of the electron wind.

The apparatus in FIG. 4 maintains the electron wind 27 substantially constant, such magnitude being determined by the set point 23. Therefore, the extent of smoothness of the coating 70*b* also will tend to be constant. However, it is possible that the thickness of the coating 70 may vary, for example, due to undulations in the coating as is seen in the coating portion 70*a*. Such changes in thickness may affect the impedance or resistance R in the space 12, which, absent the current control and force control provided by the apparatus 1, would result in a variation in force, and, therefore, a variation in the extent of smoothness in the coating of 70*b*. The present invention accommodates such changes in resistance R, and, accordingly, maintains a constant current I, constant force of electron wind 27, and, therefore, substantially constant extent of smoothness of the coating 70*b*.

Figure 5:
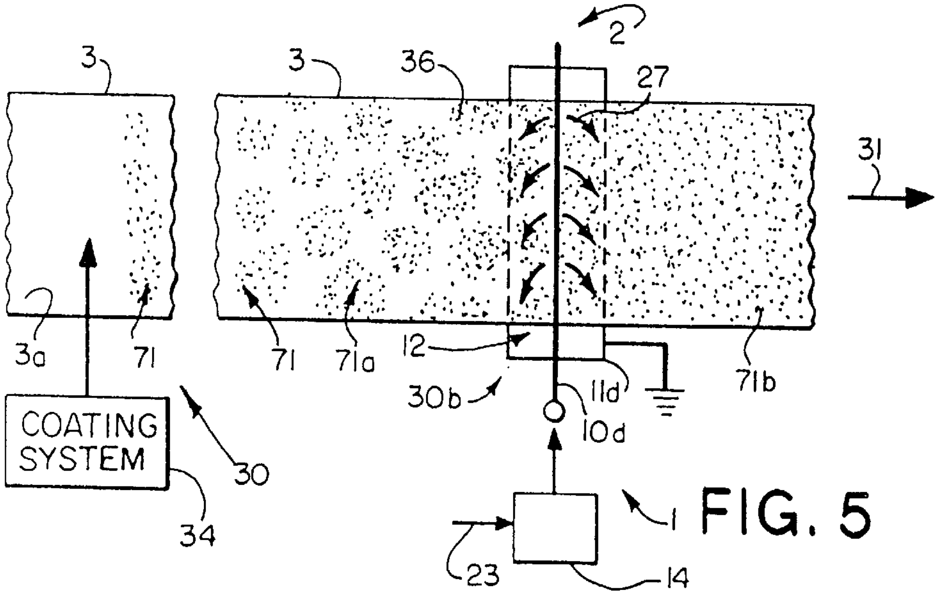
FIG. 5 is a schematic illustration of a method according to the invention for spreading a coating on a web.

The apparatus 1 is shown in FIG. 5 for providing a spreading function. The apparatus 1 is located at a further processing zone 30*b* shown relatively downstream of the coating system 34 of the machine 2. The further processing zone 30*b* may be upstream, which is preferred, or downstream of the curing apparatus 39. The processing zone 30*b* may be in addition to, in place of, or as part of the smoothing apparatus 1 shown at processing zone 30*a* in FIG. 4.

As is seen in FIG. 5, the coating 71, which is applied to the web 3 may be somewhat non-uniformly distributed on the surface 3*a* of the web. Such non-uniformity is especially evident at the location 71*a* relatively upstream of the apparatus 1 at the zone 30*b*. Such non-uniformity is represented schematically by a somewhat blotchy arrangement of dots depicting coating material on the web 3.

The electron wind 27 represented by arrows in FIG. 5 from the electrode 10*d* toward the electrode 11*d* both urges the web 3 toward the electrode 11*d* and tends to spread or to distribute the coating material 36 on the web so the coating is more uniformly distributed on the web surface 3*a*, as is indicated at coating area 71*b*. By changing the magnitude of the electron wind 27, for example, by altering the set point provided at 23 to the circuit 14 of the apparatus 1, the extent of spreading can be controlled. A larger electron wind will cause greater spreading action, and vice versa.

By maintaining the current I and the electron wind force 27 substantially constant, the extent of spreading can be substantially constant thereby to maintain a substantially uniform distribution of the coating material over the surface 3*a* of the web 3, as is indicated at 71*b*. Therefore, as the amount of coating on the web at any given location may vary, thus varying the resistance R in the space 12, the force of the electron wind nevertheless remains constant, as is determined by the set point 23, for example, and the spreading action remains substantially constant, too.

Figure 6:
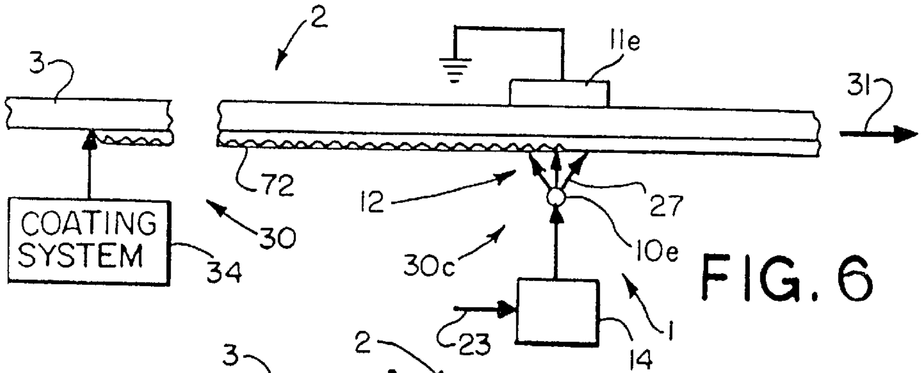
FIG. 6 is a schematic illustration of a method according to the invention for curing a coating on a web.

Turning to FIG. 6, use of the electron wind generating apparatus 1 to cure or to contribute in the curing of a coating 72 applied to a web by a web processing machine 2, for example, is illustrated. The components of the apparatus 1 are similar to those described above, including a circuit 14 to supply energization of electrodes 10*e*, 11*e* to provide an electron wind 27 in the space 12. The apparatus is located at a further processing zone 30*c*, which may be located downstream of the coating system 34 at the processing zone 30. The apparatus I to provide curing at a processing zone 30*c* may be in addition to or in place of any one of the other processing zones or devices described herein. For example, if used in addition, the apparatus 1 may be located either relatively upstream or downstream of another processing zone and apparatus there.

The ions or electrons in the electron wind 27, as is shown in FIG. 6, have been found useful to cure or to assist curing of some coating materials. This has been found especially true in instances when the coating is responsive to such an electrical input to under go curing. For example, it has been found that a silicone coating that contains a quantity of platinum will cure in response to such application of electrical energy (electrons) thereto. Although the polarity of the electron wind voltage supply 20 has been found usually to be irrelevant to the operation of the invention, in some instances, such as curing, it is necessary to have a positive polarity, e.g., the electrode 10 is positive relative to the ground electrode 11.

In the embodiment of FIG. 6, since the current I and electron wind resulting therefrom can be set at a desired curing set point $I_S$. and will be controlled to be substantially constant, then, by the apparatus the curing effect can be maintained substantially constant, even though resistance or impedance in the space 12 may change. Therefore, as the web 3 is moved along the path of the machine 2 in the direction of the arrows 31, proper curing of the coating 72 on the web can be obtained even though such variations in ambient conditions, for example, may vary.

Figure 7:
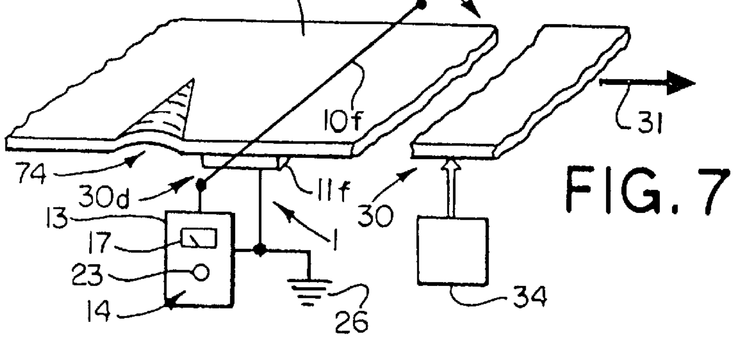
FIG. 7 is a schematic illustration of a method according to the invention for removing dimensional irregularities in a web.

Referring to FIG. 7, use of an electron wind generating apparatus 1 to smooth unevenness or other distortions in the web 3 is shown at a processing zone 30*d* of a web processing machine 2. The apparatus 1 may be the same as the apparatus 1 described above. The processing zone 30*d* may be located at various places along the path of travel of the web 3 in the direction of the arrow 31. However, to help assure that the web 3 is relatively smooth and even before it reaches the coating system 34 at the processing zone 30, the apparatus 1 and processing zone 30*d* may be relatively upstream of the processing zone 30.

As is seen in FIG. 7, the web 3 has a wrinkle 74 in it. The wrinkle 74 may be due to a non-uniformity in the material of which the web 3 is formed, which occur especially in relatively inexpensive web material. It may be due to the fact that the web material is longer at one edge than it is at the other, and it may be due to some other reason. Preferably the web 3 is uniform when it reaches the processing zone 30 so that the coating applied by the coating system 34 will be as uniform as possible or in any event will have the desired characteristics without having to be concerned with unexpected changes in the web material itself.

The apparatus 1 at the processing zone 30*d* applies an electron wind 27 substantially uniformly across the width of the web 3. That electron wind, which flows from the electrode 10*f* toward the electrode 11*f* tends to urge the web into engagement with the electrode 11*f* causing some degree of friction and/or tension. Also, that electron wind tends to smooth out the wrinkle or undulation 74 in the web so that the web itself is relatively smooth or uniform across its width and length when it arrives at the processing zone 30 where it is coated. As a result, the coating can be applied with consistency and uniformity.

Since the electron wind force 27 is maintained substantially constant at the processing zone 30*d*, the characteristics of the web which has passed the processing zone 30*d* are substantially uniform. It is possible that the resistance/impedance in the space 12 may change due to changes in the shape of the web 30 passing through the processing zone 30*d*. For example, the non-linear wrinkle 74 may cause that resistance to change. Since the current I and electron wind force 27 are maintained substantially constant in the apparatus 1 at the processing zone 30*d*, the wrinkle 74 will be smoothed similarly to smoothing of other wrinkles or non-uniformities in the surface or shape of the web 3; and the web material approaching the processing zone 30 will be substantially uniform.

Figure 8:
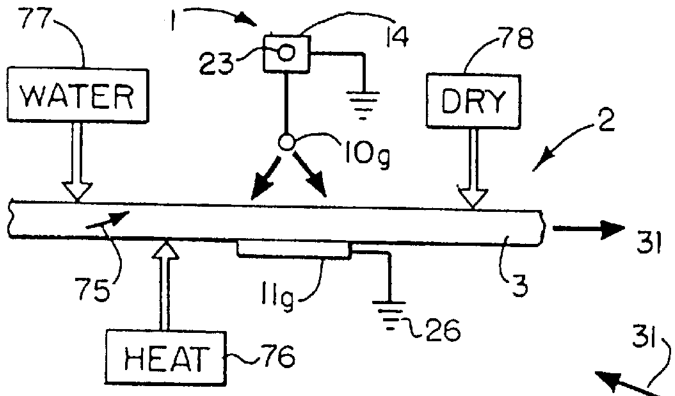
FIG. 8 is a schematic illustration of a method according to the invention for removing curl in a web.

Sometimes a web 3 may have a tendency to curl, as is represented by the arrow 75 in FIG. 8. This may be the case whether the web is of paper material or of some other material. The apparatus 1 may be used to reduce or to eliminate such curl by applying an electron wind force 27 to the web 3 in the manner depicted in FIG. 8. For example, if the web is to be cut into flat sheets after it has passed the apparatus 1 at the processing zone 30*e* without being rolled up on a reel, the electron wind force 27 can be directed at the web 3 urging it against the electrode 11*g* in such a way that curl is reduced or removed. If desired, the electrode 11*g* may be shaped, for example, curved, in such a way as to assist in removing the curl. Additional treatment may be provided the web to remove such curl. For example, if the web is of a plastic material, heat may be applied by a heater 76 or the like to soften the web material so that the force of the electron wind will act on the softened web material to eliminate or to reduce the curl. Alternatively, if the web 3 is paper material, the web material can be dampened with water from a water supply 77. The dampened web material then may be subjected to the force of the electron wind at the processing zone 30*e*, and, if necessary, the web can be dried by a drier 78, such as an air drier, heater, etc., at a relatively downstream location processing zone 30*e*.

Figure 9:
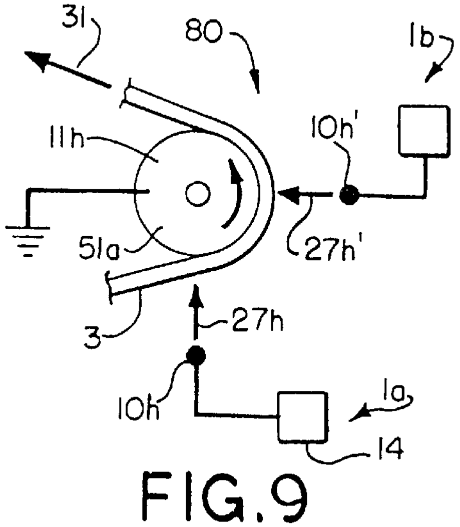
FIG. 9 is a schematic illustration of an electrostatic force applying system according to the invention for providing both tension and anti-slipping function.

Turning to FIG. 9, a web moving system 80 is shown. The system 80 may be used in a web processing machine 2 described herein or in another machine or device. The web moving system 80 includes a pair of electron wind generating apparatuses 1*a*, 1*b*, which cooperate with a drive roll 51*a*, similar to the drive roll 51 mentioned above or some other drive roll, to smooth and/or otherwise to remove wrinkles from a web 3 and to drive the web in a direction of the arrow 31. Relatively inexpensive paper used as web material may tend to have wrinkles in it due to different dimensionality characteristics occurring in the paper, such as variations in length at respective edges, variations in density, tensile strength, etc. The drive roll 51*a* preferably is electrically conductive or has an electrically conductive layer serving as an electrode 11*h*, which is grounded, as shown at 26. The two electron wind generating apparatuses 1*a*, 1*b* preferably share the electrode 11*h* as a common electrode for each. The apparatus 1*a* includes an electrode 10*h* coupled in circuit 14 to provide a controlled electron wind 27*h* directed toward the web 3 and the electrode 11*h* of the drive roll 51*a*. The electron wind 27*h* tends to smooth the web 3 and to remove or to prevent wrinkles and/or other defects due to "baggy" characteristics of the web material. The electron wind 27*h* tends to keep the web taught and, therefore, to prevent change in length of the web at a particular spot, thus avoiding wrinkles and/or other non-uniformities. Preferably the location of the electrode 10*h* is sufficiently upstream of the drive roll 51*a* and electrode 11*h* so that the electron wind 27*h* will apply a force to the web 3 without actually urging the entire web into engagement with the drive roll 51*a*. However, it also is possible that the apparatus 1*a* does cause at least part of the web 3 to engage the drive roll 51*a*.

The electron wind generating apparatus 1*b* includes an electrode 10*h*', which directs an electron wind 27*h*' toward the web 3 and electrode 11*h* of the drive roll 51*a*. The electron wind 27*h*' in a sense provides a hard nip so that the web is held tightly against the drive roll 51*a* with controlled (preferably minimal) slippage. Therefore, the driving force from the drive roll 51*a* is provided efficiently to the web 3 moving the web in the direction of the arrow 31. Thus, the embodiment illustrated in FIG. 9 shows how a plurality of electron wind generating apparatuses can be used together to provide multiple functions with respect to a web 3 and processing of the web. It will be appreciated that the various functions of respective electron wind generating apparatus and processing zone combinations described above and others that may be conceived may be used in combination in various ways, such as the several described in the description hereof.

Figure 10:
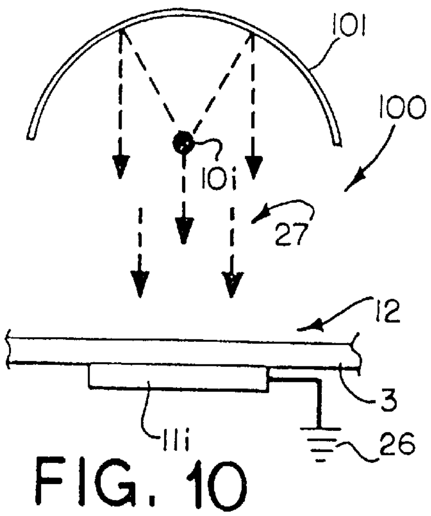
FIG. 10 is a schematic illustration of an alternate embodiment of the invention in which a reflector is used to reflect electron flux/electrostatic charge.

In FIG. 10 a modified electron wind generating apparatus 100 is shown. The apparatus 100 may be used with or in place of any of the electron wind generating apparatuses described herein, for example, in a web processing machine 2 and/or with respect to respective methods of use disclosed herein and other methods, too. The apparatus 100 includes a reflector 101 for reflecting the electron wind from the electrode 10*i* toward the electrode 11*i*. The reflector 101 preferably is a dielectric material or some type of electrically non-conductive material. An exemplary material is cardboard. The reflector 101 may be curved or some other shape. In the apparatus 100 the reflector 101 is generally parabolic shape so as to reflect the electron wind 27 in the space 12 efficiently toward the electrode 11*i* in the manner shown by the dotted lines in FIG. 10. Operation of the apparatus 100 is similar to the operation of the apparatus 1 described above. The electrode 10*i* supplies electrons or ions into the space 12. Some of those electrons are directed toward the electrode 11*i* directly from the electrode 10*i*. The reflector 101 is intended to reflect additional electrons from the electrode 10*i* toward the electrode 11*i* thereby increasing the number of ions or the electron flux and, therefore, the electron wind compared to the magnitude thereof when no reflector is used. It has been found that the reflector 101 tends to increase the electron flux and, thus, the electron wind by approximately 20% relative to the apparatus 1 in which no reflector is used.

The reflector 101 alternatively may be electrically conductive. However, such a conductive reflector may drain energy from the electron wind. Therefore, it usually is advantageous to use a dielectric material for the reflector in order to avoid draining energy from the apparatus 100 that would reduce the electron wind.

Figure 11:
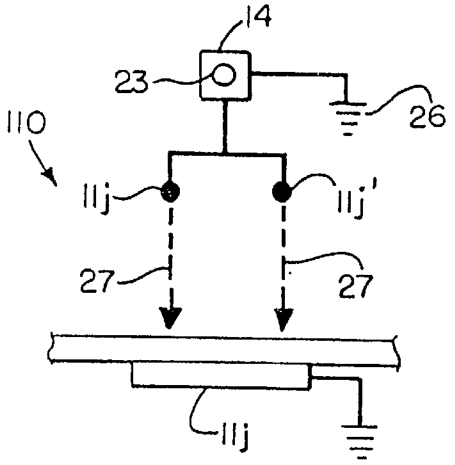
FIG. 11 is a schematic illustration of another alternate embodiment of the invention in which a plurality of first electrodes are used to supply the electron wind toward a second common electrode.

Another embodiment of electron wind generating apparatus 110 is shown in FIG. 11. The apparatus 110 is similar to the apparatus 1 described above and may be substituted therefor in the various embodiments of the machine 2 described herein or in other embodiments, machines or systems. However, the apparatus 110 includes a plurality of electrodes 10, for example, a pair of electrodes 10*j* and 10*j*', which are coupled in the circuit 14 to develop an electron wind directed toward the electrode 11*j*. The electrodes 10*j* and 10*j*' preferably are coupled in electrical parallel relation by a connection 111 so that the electron wind 27 supplied by each electrode toward the common electrode 11*j* is approximately the same. The current I supplying electrons to the respective electrodes 10*j*, 10*j*' will divide approximately evenly and will be maintained substantially constant by the circuit 14 in the manner described above with respect to the apparatus 1. By increasing the number of electrodes 10*j*, 10*j*', etc., the electron wind force 27 can be distributed over a larger area of the material located in the space 12 of the apparatus 110.

It will be appreciated that the various embodiments of electron wind generating apparatus 1 disclosed herein may be used for a variety of purposes, such as those described and others, too. The electron wind generating apparatus enables the application of force, curing input, etc., to a web material without detrimentally affecting the characteristics of the coating on the web material. Also, force may be used to improve the web itself for coating and/or the coating itself. The time in a curing zone can be relatively accurately controlled because of control of slippage as a web is driven along a path in a web processing machine, and in some instances electron wind and the electrons thereof may be used to provide for curing, in some instances without having to subject the web to a high temperature environment.

It has been found that substantial energy can be saved by using the present invention. For example, prior devices used to obtain a hard nip for isolating portions of a web moving through a web processing machine between a drive roll and a nip forming or idler roll can require approximately 3 to 5 horsepower (2,100–3,500 watts) energy to move the drive roll of such a hard nip. In contrast, in one embodiment of the present invention a hard nip, such as that provided by the apparatus 1*b* in FIG. 9 or the apparatus 1 associated with the drive roll 51 in FIG. 1, may be able to provide such a hard nip function using as little as approximately from 1 to 3 watts of power. Specifically, in one example, the voltage supply 20 provides approximately 30,000 volts and the current is approximately 1 tenth milliamp or less.

TECHNICAL FIELD

From the foregoing it will be appreciated that the invention provides apparatus and method for coating web material and the like.

The embodiments of the invention claimed are, as follows:

1. A method of applying an electrostatic force to a moving web, comprising moving a substantially non-conductive web in a space between at least one pair of electrodes, supplying a voltage to the electrodes to cause a flow of current in the space between the electrodes to apply an electrostatic force to the web, and controlling the electrostatic force to maintain the electrostatic force at a selected value by controlling the current flowing between the electrodes.

2. The method of claim 1, said supplying a voltage comprising supplying voltage from a voltage source, said controlling the electrostatic force by controlling the current comprising measuring the current flow from the voltage supply to one of the electrodes, and based on the measurement adjusting the voltage to maintain the current to a respective value.

3. The method of claim 2, said adjusting the voltage comprising adjusting voltage to maintain the current substantially constant although impedance between the electrodes may vary.

4. The method of claim 3, further comprising setting the respective value for the current to which the current is to be maintained substantially constant.

5. The method of claim 3, said supplying voltage comprising supplying a DC voltage.

6. The method of claim 5, said supplying a DC voltage comprising supplying a pulsed DC voltage.

7. A method of forming a hard nip in a moving web, comprising the method of claim 3, and further comprising directing the electrostatic force to urge the web against one of the electrodes to form the nip.

8. A method of applying tension to a moving web, comprising the method of claim 7, and further comprising applying a pull force to the web relatively downstream of the nip to apply tension to the web.

9. The method of claim 8, further comprising setting the current to adjust the tension applied to the moving web.

10. A method of reducing length variations in a moving web, comprising the method of claim 8, and further comprising setting the current to adjust the tension in the web to stretch the web to maintain substantially uniform length profile across a width of the web.

11. A method of removing curl in a web comprising the method of claim 8, and further comprising applying moisture to the web upstream of a location at which the electrostatic force is applied, and removing moisture from the web.

12. The method of claim 11, said removing moisture comprising heating the web.

13. The method of claim 11, said removing moisture comprising evaporation.

14. A method of smoothing a coating on a web comprising the method of claim 3, and further comprising applying a coating to the web upstream of a location at which the electrostatic force is applied, and said controlling the electrostatic force by controlling the current comprising setting the current to apply an electrostatic force to smooth the coating.

15. A method of spreading a coating on a web comprising the method of claim 3, and further comprising applying a coating to the web upstream of a location at which the electrostatic force is applied, and said controlling the electrostatic force by controlling the current comprising setting the current to apply an electrostatic force to spread the coating on the web substantially uniformly on the web.

16. A method of curing a coating on a web, comprising the method of claim 1, and further comprising applying to the web, at a location upstream of a location at which the electrostatic force is applied, a coating material which is susceptible to curing in response to application of electrons thereto.

17. The method of claim 16, further comprising selecting the coating material as silicone with a platinum ingredient responsive to application of electrons to undergo curing.

18. A method for applying a controlled force to a web, comprising directing an electric current between a source of electrostatic energy and an electrically conductive member to create an electrostatic force to urge a substantially non-conductive web toward the member, and controlling the electric current to control the electrostatic force applied to the web to a selected value.

19. The method of claim 18, said directing comprising supplying a DC voltage between a pair of electrodes, one of which comprises at least part of the member, such that the electric current flows between the electrodes to create a corona wind that provides the force to urge the web toward the member.

20. The method of claim 19, said controlling the electric current comprising adjusting the DC voltage to maintain the electric current substantially constant while the impedance between the electrodes may vary.

21. The method of claim 20, wherein the electrodes are spaced apart and said adjusting comprises adjusting the voltage to maintain substantially constant current flow to maintain substantially constant force while electrical impedance characteristic in the space between the electrodes may vary.

22. The method of claim 21, further comprising measuring the current flow, and based on the measurement adjusting the voltage to maintain substantially constant current.

23. The method of claim 20, said supplying a DC voltage comprising supplying a pulsating DC voltage.

24. The method of claim 20, further comprising using a wire as one of the electrodes.

25. The method of claim 20, further comprising using a grounded electrically conductive plate as the member.

26. The method of claim 20, further comprising moving the web over a roll at least part of which is electrically conductive and comprises at least part of the member, and said directing comprises directing a corona wind from the other electrode toward the roll to urge the web toward the roll.

27. The method of claim 18, said directing comprising applying a DC voltage between a pair of electrodes on opposite sides of the web to create a current flow from one electrode to the other electrode, one of the electrodes comprising at least part of the member, and reflecting electron flux from the one electrode to increase the electron flux and the current flow from the one electrode to the other electrode.

28. The method of claim 27, said reflecting comprising using a dielectric reflector.

29. The method of claim 18, said directing comprising applying a DC voltage at a voltage of between about 30 KV and about 80 KV.

30. The method of claim 29, said directing comprising providing the electric current between the electrodes of about 0.1 ma.

31. The method of claim 18, said directing comprising directing a current flow between plural electrodes, one of which is a wire material, to create the electrostatic force urging the web against the other electrode with a force that is on the order of about 3 pounds per linear inch of the web.

32. The method of claim 18, said directing comprising directing a current flow between first plural electrode means and second electrode means to create the electrostatic force urging the web against the second electrode means.

33. The method of claim 18, said controlling the electric current comprising maintaining a substantially constant current proportional to the force applied to the web.

34. The method of claim 33, further comprising using a voltage source as the source of electrostatic energy, measuring current flow causing the electrostatic force, and based on said measuring adjusting the voltage to maintain substantially constant current flow as impedance of the current flow may vary.

35. A method for applying a controlled corona wind to a substantially non-conductive material for maintaining a constant force on the material, comprising directing a corona wind toward he substantially non-conductive material, and controlling current of the corona wind to maintain a substantially constant current of the corona wind to maintain a substantially constant force on the material although electrical impedance in a path of the corona wind may vary.

36. A method of controlling tension in a substantially non-conductive web traveling along a path, comprising directing a corona wind toward the substantially non-conductive web to urge the web against a surface, and adjusting current flow in the corona wind to control force urging the web against the surface to a selected value.

37. The method of claim 36, said step of adjusting current comprising maintaining the current substantially constant to maintain the force substantially constant although electrical impedance in a path of the corona wind may vary.

38. A method of spreading or smoothing a coating located on a surface, comprising applying a corona wind to the surface with sufficient force to distribute a coating on the surface, and controlling electric current causing the corona wind to control the corona wind to a selected value.

39. The method of claim 38, wherein the surface is the surface of a substantially non-conductive web, and further comprising applying the coating on the web, and moving the coated web through the corona wind.

40. A method of avoiding distortions in a moving substantially non-conductive web, comprising applying an electrostatic force to the substantially non-conductive web to urge it into engagement with another surface to resist movement and to create a tension in the web, and controlling the force with which the web is urged into engagement to control the tension and to maintain length characteristics of the web substantially constant across the width of the webs said applying comprising applying an electron wind to the web, said applying an electron wind comprising measuring current creating the electron wind and maintaining the current substantially constant while impedance in a path of the electron wind may vary.

41. A method of removing curl from a substantially non-conductive web traveling along a path, comprising applying moisture to the substantially non-conductive web, and stretching the web between a drive roll and a hard nip, and forming the hard nip by applying an electrostatic force between a source of electrons and an electrically conductive member to urge the web toward the member, further comprising supplying electrical current from the source of electrons to establish the electrostatic force, and controlling electrical current establishing the electrostatic force to maintain control of the force on the web at the hard nip at a selected value.

42. A method of controlling the dimensionality of a web travelling along a path, comprising stretching the web between a drive roll and a hard nip, and forming the hard nip by applying an electrostatic force between a source of electrons and an electrically conductive member to urge the web toward the member, and fiber comprising supplying electrical current from the source of eletrons to establish the electrostatic force, and controlling a electrical current establishing the electrostatic force to maintain control of the force on the web at the hard nip at a selected value.

43. A method of curing a coating on a substantially non-conductive web, comprising applying a controlled electrostatic energy field to the substantially non-conductive web and a coating to effect curing of the coating, and said applying comprising controlling current of the electrostatic energy field at a selected value.

44. The method of claim 43, said controlling current comprising maintaining the current substantially constant during the curing.

45. The method of claim 44, further comprising moving the coated web through the electrostatic energy field.

46. The method of claim 43, further comprising adding an ingredient to the coating to make the coating susceptible to ions from the electrostatic energy field so as to enhance the curing.

47. The method of claim 46, wherein the coating material comprises silicone and said adding comprises adding platinum.

48. The method of claim 43, wherein the coating includes an ingredient to make the coating susceptible to ions from the electrostatic energy field so as to enhance the curing.

49. The method of claim 43, comprising using a positive DC voltage to form a corona wind as the electrostatic energy field, and said applying comprising applying the corona wind to the web and the coating.

* * * * *